United States Patent [19]
Dinha

[11] Patent Number: 6,115,372
[45] Date of Patent: Sep. 5, 2000

[54] SYNCHRONOUS PACKET SWITCHING

[75] Inventor: Francis Dinha, Pleasanton, Calif.

[73] Assignee: NewCom Technologies, Inc., Pleasanton, Calif.

[21] Appl. No.: 09/018,594

[22] Filed: Feb. 4, 1998

[51] Int. Cl.[7] .................................................. H04L 12/66
[52] U.S. Cl. .......................................... 370/352; 370/468
[58] Field of Search ..................... 370/230, 351, 370/352, 355, 357, 359, 340, 464, 465, 468, 467

[56] References Cited

U.S. PATENT DOCUMENTS

| | | |
|---|---|---|
| 4,771,425 | 9/1988 | Baran et al. . |
| 4,819,228 | 4/1989 | Baran et al. . |
| 5,265,092 | 11/1993 | Soloway et al. . |
| 5,570,355 | 10/1996 | Dail et al. ................................. 370/352 |
| 5,579,312 | 11/1996 | Regache . |
| 5,673,253 | 9/1997 | Shaffer ...................................... 370/229 |
| 5,675,573 | 10/1997 | Karol et al. ............................. 370/230 |
| 5,732,078 | 3/1998 | Arango ...................................... 370/355 |

*Primary Examiner*—Ajit Patel
*Assistant Examiner*—Bob A. Phunkulh
*Attorney, Agent, or Firm*—Beyer Weaver & Thomas, LLP

[57] ABSTRACT

The present invention provide methods and apparatuses for integrating real time and best effort communications over a common medium. The ability to integrated different types of communications also allows the present invention to integrate sub-networks utilizing different physical and link layer communication protocols. While a common network layer protocol is preferred, the physical or link layer communication protocols may be any type of packet based communication protocols.

18 Claims, 10 Drawing Sheets

SYNCHRONOUS PACKET SWITCHING

BACKGROUND OF THE INVENTION

The present invention relates to communication networks. More particularly, the present invention relates to an apparatus and method of integrating communication among communication networks and devices that implement disparate protocols so that both real-time traffic and best-effort traffic may be exchanged over a common medium.

Currently, individuals have a myriad number of different ways of communicating with each other. Typically, data pertaining to the myriad number of forms of communications fall into two broad traffic classes. The first traffic class is real time communication, which pertains to data transmission having a low and/or deterministic delay. Real time communication is typically provided by telephone networks or proprietary networks that can guarantee end-to-end bandwidth availability for a given data flow. The second is non-real time, best effort communication, which pertains to data that do not require transmission in real time. Best effort communication, such as the transmission of non time-critical data files, typically takes place as bandwidth becomes available over a network. Currently, best effort communication may take place through a computer network or a global network like the Internet.

Because these two separate data classes have different bandwidth and delay requirements, they are typically implemented over at least two separate communication networks utilizing at least two different trunk resources. Accordingly, telecommunication companies (telcos) must then support two different communication networks for individuals to fully communicate with each other. The burden of supporting these two traffic classes becomes more challenging when incompatible communication devices employing disparate protocols are involved.

Typically, a communication network employs several layers of communication protocols in order to facilitate communications. Initially a communication network is based upon the type of communication medium. For example, a network may be based upon a twisted wire or fiberoptic communication medium. The first layer (layer 1 or physical layer) of communication protocol determines how communications are to be characterized over the communication medium, such as defining signal levels, transmission frequencies, etc.

The second layer (layer 2 or link layer) defines the formatting of information that is carried across the communication medium. The third layer (layer 3 or network layer) controls the routing of information within the communication network. Layers 4 through 7 perform additional functions between the network layer and a user to enable the user to carry out a communication. A more detailed description of communication protocol layers is presented in "Internetworking with TCP/IP, Principles, Protocols, and Architecture", by Douglas Comer, published by Prentice Hall, which is incorporated herein by reference in its entirety.

Thus, in addition to the necessity of supporting the inherent different voice and data communication networks, telcos and organizations must deal with the possibility of having to support different communication protocols, especially different physical layer (layer 1) and link layer (layer 2) protocols, between different networks.

To facilitate discussion, FIG. 1 illustrates an exemplary prior art method of providing real time and best effort communication between two individuals 30 and 60. In the illustrated example, a data network 70 and a telephone network 80 provide best effort and real time communications, respectively, between offices 10 and 40.

Data network 70 is useful for exchanging files, data, and other types of communication that do not require low and/or deterministic delay guarantees. Data network 70 may include a public data network 71, such as the Internet, and a private data network 72. Public network 71 is typically useful to allow communication between each of individuals 30 and 60 with a myriad number of services through various Internet service providers and servers, such as Internet server 78. Also, individuals 30 and 60 may be able to communicate with one another through the resources of public network 71.

However, if individuals 30 and 60 belong to the same organization or commonly communicate with each other, a private data network 72 may be utilized. A private data network may be implemented for best effort data in order to ensure improved security, bandwidth availability, and reliability relative to the public network. In the example of FIG. 1, private data network includes trunk resources such as data trunk lines 73(0)–73(n). Typically, data trunk lines 73(0)–73(n) are T1 or DS3 unchannelized data lines that are provided or leased by, for example, a telecommunications service provider. Data communication through data network 70 typically takes place in an asynchronous manner.

Each router 12 and 42 are typically connected to a number of communication devices, such as local area network (LAN) switches 16 and 46 and servers 19 and 49. Computers 17, 18, 47 and 48 may also be coupled to LAN switches 16 and 46. Thus, individual 30 through computer 18 may conduct communications with individual 60 through computer 48 and the devices and networks coupling the two computers. Again, the form of communications permitted by the data network is typically limited to best effort communications.

When real time communications is desired, a synchronous communication network is typically employed. As mentioned before, real time traffic, such as telephone conversations or real time video/audio data, require a data network that is capable of guaranteeing the required bandwidth and low/deterministic transmission delay. Because of these requirements, real time data communication typically takes place in a synchronous manner. Currently, the telephone networks (both public and private) provided by telecommunication service providers are typically utilized for real time communications.

Referring further to FIG. 1, offices 10 and 40 are typically connected to each other by a real time communication network 80 to facilitate real time communication. Real time communication network 80 may include a public switched telephone network (PSTN) 81 and/or a private real time communication network 82. PSTN 80 may represent, for example, the telephone network utilized by the telecommunications service provider, which allows communications to telephones 82 and 20(0 . . . n) through the public trunk resources.

Private real time communication network 82 typically consists of dedicated real time data trunk lines 83(0)–83(n) that connect the offices. Real time data trunk lines 83(0)–83 (n) may represent, for example, channelized T1 or DS3 lines that offer 24 voice channels a piece. As in the best effort communication situation, the use of a private real time communication network provides improved convenience, bandwidth availability, reliability and security.

Generally, offices 10 and 40 include private branch exchanges (PBXs) 14 and 44 that are coupled to the public switched and private real time communication networks. The PBXs are in turn connected to a number of telephones 20(0)–20(n) and 50(0)–50(n). Individual 30 may, for example, utilize telephone 20(0) to communicate in real time with individual 60 through telephone 50(0) through either the private or public switched real time networks.

Thus, the prior art requires two vast and extensive communication networks and different communication mediums in order to facilitate data communication of both traffic classes (i.e., the real time and best effort traffic classes). As discussed in connection with FIG. 1, both asynchronous and synchronous communication networks may be required. For organizations desiring private networks, they (and the telcos that provide such networks) must contend with greater costs with regard to establishing and maintaining two separate private networks and sets of trunk resources in order to allow their employees to communicate in both real time and best effort methodologies. In many cases, the implementation of these different communication networks are closely tied to a specific link layer technology and protocols, requiring extensive investments in implementation, maintenance, and upgrade.

By way of example, individuals 30 and 60 and their organization must pay for the costs associated with maintaining two private networks 72 and 82 if both modes of communication are desired. At the same time, the telecommunications service provider(s) that provide the private data and telephone networks must bear the costs of implementing, maintaining, and upgrading two different sets of trunk lines and many different types of communication devices. Each time the underlying link layer technology changes, such upgrades can be very costly.

Therefore, there is desired an integrated service architecture for implementing real time and best effort communication using a common medium, e.g., the same set of trunk lines. A method of interconnecting communication networks employing different physical and link layer protocols is further desired.

SUMMARY OF THE INVENTION

The present invention provide methods and apparatuses for integrating real time and best effort communications over a common medium. The ability to integrated different types of communications also allows the present invention to integrate sub-networks utilizing different physical and link layer communication protocols. While a common network layer protocol is required, the physical or link layer communication protocols may be any type of packet based communication protocols.

In one embodiment, the present invention provides asynchronous type functionality to sub-networks utilizing connection based communication protocols. Asynchronous type functionality is provided, but synchronous communications are guaranteed as well asynchronous communications. Such integration is possible through the switching capabilities of the present invention.

In another embodiment, switching is carried out on an available bandwidth basis. Virtual paths are assigned to the communication channels linking a plurality of communication devices. The virtual paths are limited by the amount of bandwidth the virtual paths can handle. The communication devices are assigned to virtual networks that define the bandwidth and traffic handling requirements of virtual circuits established within the virtual network. A communication device, in accordance with an embodiment of the present invention, switches packets of information through the virtual circuits established through the virtual paths and the other communication devices. Switching is performed based upon the bandwidths of the virtual paths and the bandwidth required by the virtual circuit, as inherited from the virtual network to which the virtual circuit belongs.

In another embodiment, a communication device in accordance with the present invention switches the packets of information based upon the bandwidth and traffic handling requirements of the packets of information inherited from the underlying virtual network. In one embodiment, the packets of information may be best effort communications having a zero bandwidth requirement, but requiring that any available bandwidth of the virtual path be utilized to forward the packets of information. In another embodiment, the packets of information are real time communications requiring a predetermined bandwidth to be forwarded. If the virtual path does not have enough available bandwidth the real time packets of information are not forwarded.

In an alternate embodiment, if the packets of information of real time communications exceeds the predetermined bandwidth the communication device may forward the packets based upon the traffic handling requirements of the packets, inherited from the underlying virtual network. In one embodiment, the traffic handling requirement causes the communication device to forward the real time packets of information according to the bandwidth requirement of the virtual circuit. In another embodiment, the traffic handling requirement causes the communication device to forward the real time packets of information exceeding the bandwidth requirement utilizing any available bandwidth of the virtual path. In yet another embodiment, the traffic handling requirement causes the communication device to drop real time packets of information in exceeding the bandwidth requirement.

The ability to form virtual circuits based upon the characteristics of the virtual paths allows the present inventions to guarantee real time communications. Also, provisions for best effort communications also allow both types of communications to take place at the same time over a single medium or virtual path. The switching of the packets of information are disparate from he physical and link layer communication protocols of underlying sub-networks, and therefore is capable of integrating different sub-networks utilizing different physical and link layer protocols. These and other advantages of the present invention will become apparent upon reading the following detailed descriptions and studying the various figures of the drawings.

DESCRIPTION OF THE PREFERRED EMBODIMENTS

Figure 1:
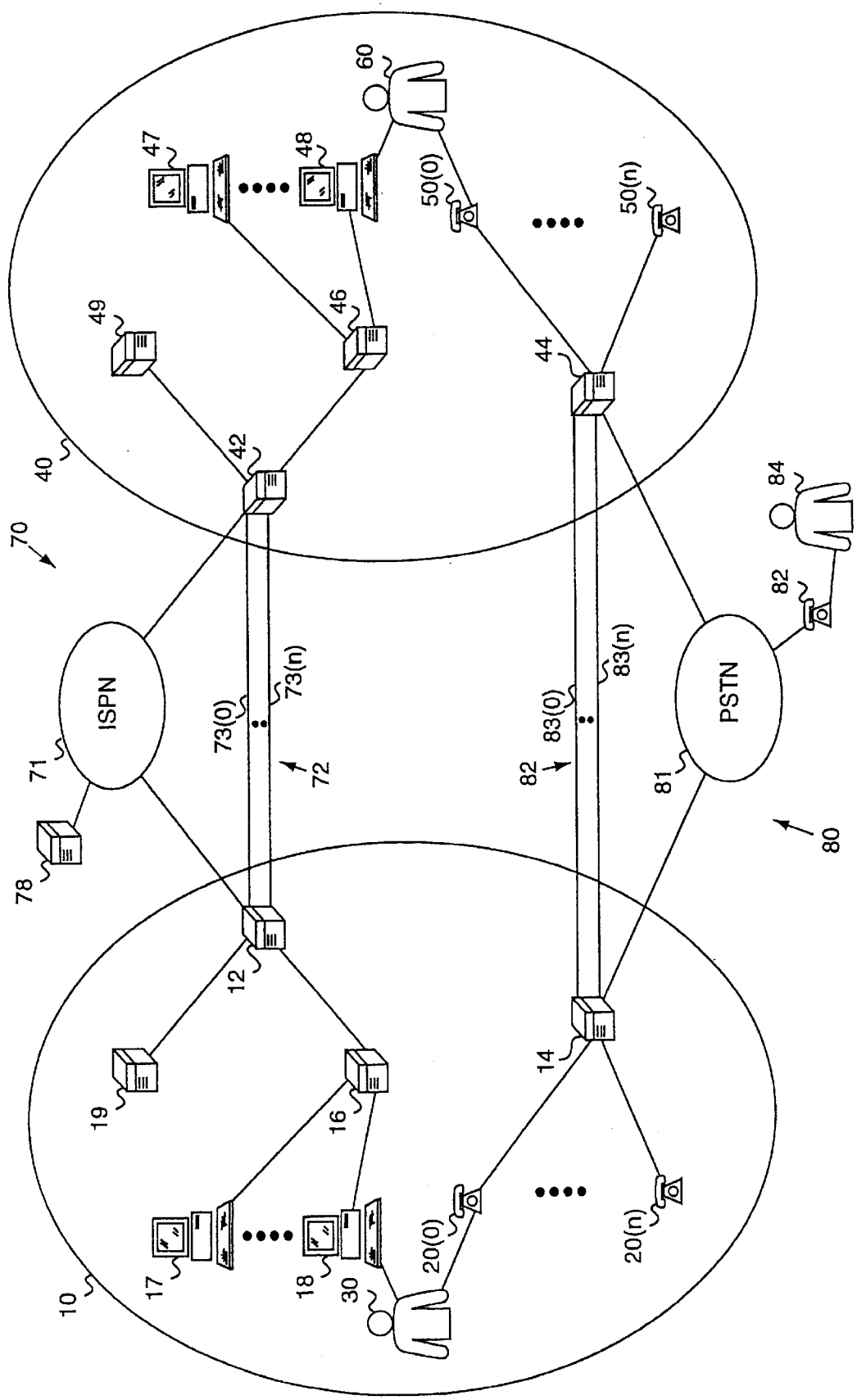
FIG. 1 illustrates an exemplary prior art method of providing communications between two individuals 30 and 60.

An invention is described for providing an integrated mode of communication encompassing real time and best effort communications. In one embodiment, a packet switching methodology known as Synchronous Packet Switching (SPS) is provided to allow both classes of traffic to be transmitted and received over a common medium (e.g., the same set of physical trunk lines). The switching methodology is deemed synchronous since incoming packets associated with a given data flow is moved synchronously by the switch to the appropriate destination interface module in the SPS network.

The present invention also provides methods of intercoupling disparate communication networks employing different physical and link layer protocols. Providing compatibility between communication networks that utilize different physical or link layer protocols has been a problem, typically since the communication networks are typically incompatible. SPS based nodes may be placed within the communication networks to interconnect them together so long as the communication networks employ a similar network layer protocol.

In accordance with one aspect of the present invention, SPS technology advantageously guarantees the level of Quality of Service (QoS) required by real time data in a way that is transparent to the end hosts and applications. Advantageously, it is not necessary to require modifications in the end hosts or real time applications to, for example, implement new resource reservation protocols to facilitate real time communication. That is, SPS technology is interoperable with existing protocols and products, including those implementing the Internet Protocol.

Further, SPS technology permits best effort traffic to be carried over the same medium as real time data. Accordingly, it is not necessary to implement two different communication networks to facilitate real time and best effort communication. In one embodiment, each real time data flow is allocated an initial bandwidth (to be modified by its requirements) that is guaranteed throughout the session. All best effort traffic is allocated an arbitrary amount of bandwidth over the integrated SPS trunk to be shared among the best effort data flows. Any residual bandwidth is employed for best effort traffic except that any residual bandwidth employed for best effort traffic is reallocated back to the residual bandwidth pool if such bandwidth is required for the guaranteed real time traffic. In this manner, bandwidth allocation is optimized in order to ensure that real time data transmission is not adversely affected by the presence of best effort traffic and to ensure efficient usage of available bandwidth for transmission of both traffic classes. Bandwidth allocation is also optimized to facilitate broadcast and multicast applications, thereby permitting SPS-enabled networks to be highly scalable for these applications.

Further, the SPS technology disclosed herein is implemented independent of the underlying link layer technology and protocols. Accordingly, it is possible to deploy SPS technology and the integrated communication it provides over a variety of link layer technologies.

Figure 2:
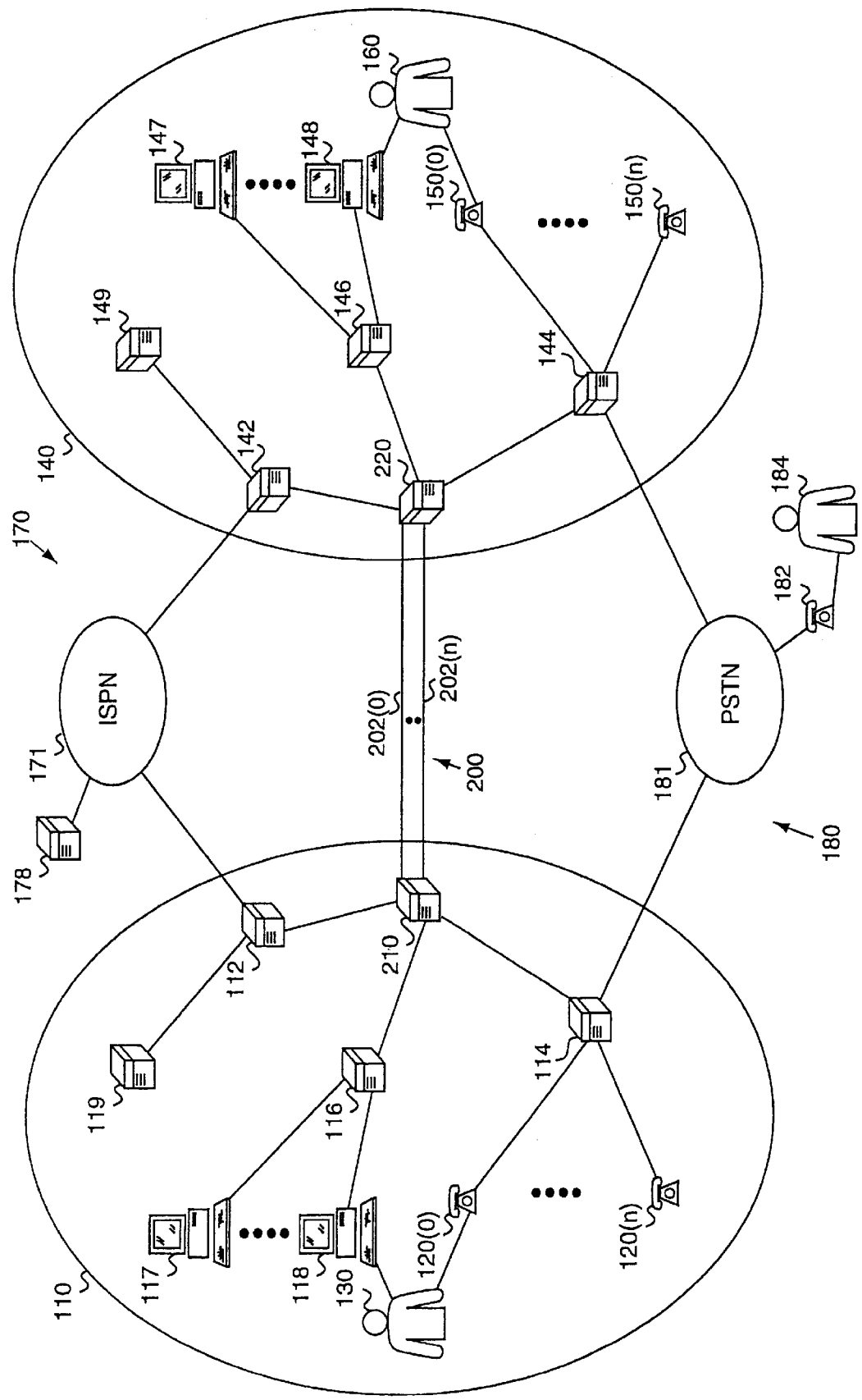
FIG. 2 illustrates an SPS network in accordance with one embodiment of the present invention.

To further discuss the advantages and features of the present invention, FIG. 2 illustrates an SPS network in accordance with one embodiment of the present invention. Offices 110 and 140 are in communication with each other through an integrated SPS medium 200. The SPS medium may be implemented by any type of suitable communication medium. By way of example, a suitable medium may include the electromagnetic spectrum, fiber optics, copper wires or any other suitable communication medium. Additionally, the protocol used over the SPS medium may be any suitable type of protocol since SPS is implemented independent of the underlying link layer protocol (as will be explained in detail herein). By way of example, the underlying link layer protocol may be asynchronous transfer mode (ATM), SONET, frame relay or any other suitable physical or link layer protocol, since SPS is decoupled from the link layer.

In one embodiment, SPS medium 200 includes a number of T1 or DS3 trunk lines 202(0)–202(n). While T1 and DS3 trunk lines were designated as either channelized or unchannelized in the description of prior art communication networks, such designations are unnecessary with respect to the present invention. Synchronous packet switching may be performed over channelized or unchannelized trunk lines. SPS may be employed over any type of link layer, as well as any type of physical medium. Therefore, trunk lines 202(0)–202(n) are simply referred to as trunk lines.

As before, offices 110 and 140 may be connected to a public data network 171 (e.g., the Internet) and a public switched telephone network 181. The public data network may be used to communicate with people and services not directly within the communication network of offices 110 and 140, such as an Internet server 178 connected to the public data network. Similarly, public switched telephone network 181 allows offices 110 and 140 to communicate with individuals outside their private communication network, for example, with individual 184 through phone 182 or to individuals within offices 110 and 140 using public trunk resources associated with public switched telephone network 181.

SPS medium 200 provides a private link between offices 110 and 140 that does not rely upon the public networks for both real time and best effort communication between the offices. Unlike prior art networks, both real time and best effort communication between offices 110 and 140 take place through a common SPS medium 200.

SPS medium 200 is able to provide this type of integrated communication through nodes employing SPS technology (SPS based nodes) 210 and 220. In the example of FIG. 2, offices 110 and 140 includes SPS based nodes 210 and 220 that are coupled to the SPS medium. Routers 112 and 142 and PBXs 144 and 114 are also coupled to SPS based nodes 210 and 220. Also, LAN switches 116 and 146 are directly coupled to SPS based nodes 210 and 220. All communications between the routers and the LAN switches take place through the SPS based nodes. The routers are thereby coupled to LAN switches 116 and 146, servers 119 and 149 and communication devices 117, 118, 147 and 148.

PBXs 114 and 144 are coupled to a number of communication devices 120(0)–120(n) and 150(0)–150(n), respectively. Individuals 130 and 150 are thereby able to communicate with each other through different types of communication devices, but all the communications are integrated over the SPS medium rather than separated out over two or more different communication networks irrespective whether the communication is based on real time or best effort.

It should be understood that SPS medium 200 may itself represent an SPS based network. That is, between SPS based nodes 210 and 220 there may be a network of further SPS based nodes coupling SPS based nodes 210 and 220 together. For ease of discussion herein, however, SPS medium 200 is assumed to be a set of trunk lines for ease of understanding.

The types of communication devices that may be coupled to SPS based nodes 210 and 220 and SPS medium 200 are not limited to those illustrated. By way of example, routers 116 and 146 may be coupled to any type of switch, server, network or communication device. Also, those devices may be coupled directly to SPS based nodes 210 and 220, as discussed further below. Routers 116 and 146, or the other types of data communication devices, may be coupled to SPS based nodes 210 and 220 regardless of the type of link layer protocol utilized by those devices. By way of example, the internal data communications network of offices 110 and 140 may utilize ATM, Ethernet, SONET, frame relay, integrated services digital network (ISDN), PSTN or any other suitable type of data communications (physical or link layer) protocol and still be able to utilize SPS based nodes 210 and 220 for communication through trunk resource 200.

SPS based nodes 210 and 220 are capable of switching the packets of information provided by the internal data communications network of the offices 110 or 140, and their respective communication protocols. SPS technology simply extracts the appropriate information from the packets of information in order to appropriately switch the packets without repacketization or reformatting of the data. However in one embodiment, SPS is focused on network layer switching. Thus, the linked sub-networks must utilize the same network layer protocol, but may have disparate layer 2 or layer 1 protocols. But, any suitable network layer protocol may be utilized so long as the coupled communication devices utilize the same network layer protocol. For purposes of illustration, without limitation, an SPS based network based on an Internet Protocol (IP) is described in further detail.

PBXs 114 and 144 may be coupled to, for example, any type of dual tone multiple frequency based device, for example, telephones, facsimile machines, modems and other suitable types of communication devices. Individual communication devices may also be directly coupled to SPS based nodes 210 and 220, as discussed further below. Typically, in prior art private real time data trunk lines, each real time data trunk line is limited to 24 voice channels. Due to the integration of voice and data communications more than 24 voice channels may be carried across a integrated SPS trunk line 202(0)–202(n). This is possible by the dynamic resource allocation made possible by SPS technology and/or compression the voice communication to permit a large number of real time data flows to exist concurrently over the trunk resource. Furthermore, SPS-based integration of both real time and best effort data communication permit other types of data communication such as computer files, e-mail, pager information, voice mail, video conferencing, video on demand, as well as other types of communication be carried out over integrated medium 200.

Through one or more SPS-based nodes, data of both traffic classes may be transmitted over the integrated medium with little, if any, modifications to the end hosts and end applications. As such, the SPS-base node may be thought of as circuits that are disposed in between existing communication sub-networks and devices and the integrated SPS medium. It is this modular approach that permits SPS technology to interoperate with existing communication sub-networks and devices and to provide a highly cost efficient solution and migration path while preserving current network investment.

Furthermore, SPS allows for coupled communications through sub-networks or communication devices capable of routing data. By way of example, medium 200 has been described as physical lines or connecting sub-networks. More broadly, medium 200 may be described as a virtual path (VP) through which communications may be channeled. The VP may consist of any number or order of lines, sub-networks or communication devices so long as the VP can guarantee the amount of bandwidth provisioned to the VP. VPs that cannot guarantee the provisioned amount of bandwidth may still be used to carry best effort traffic, but may not be suitable for real time traffic.

Figure 3:
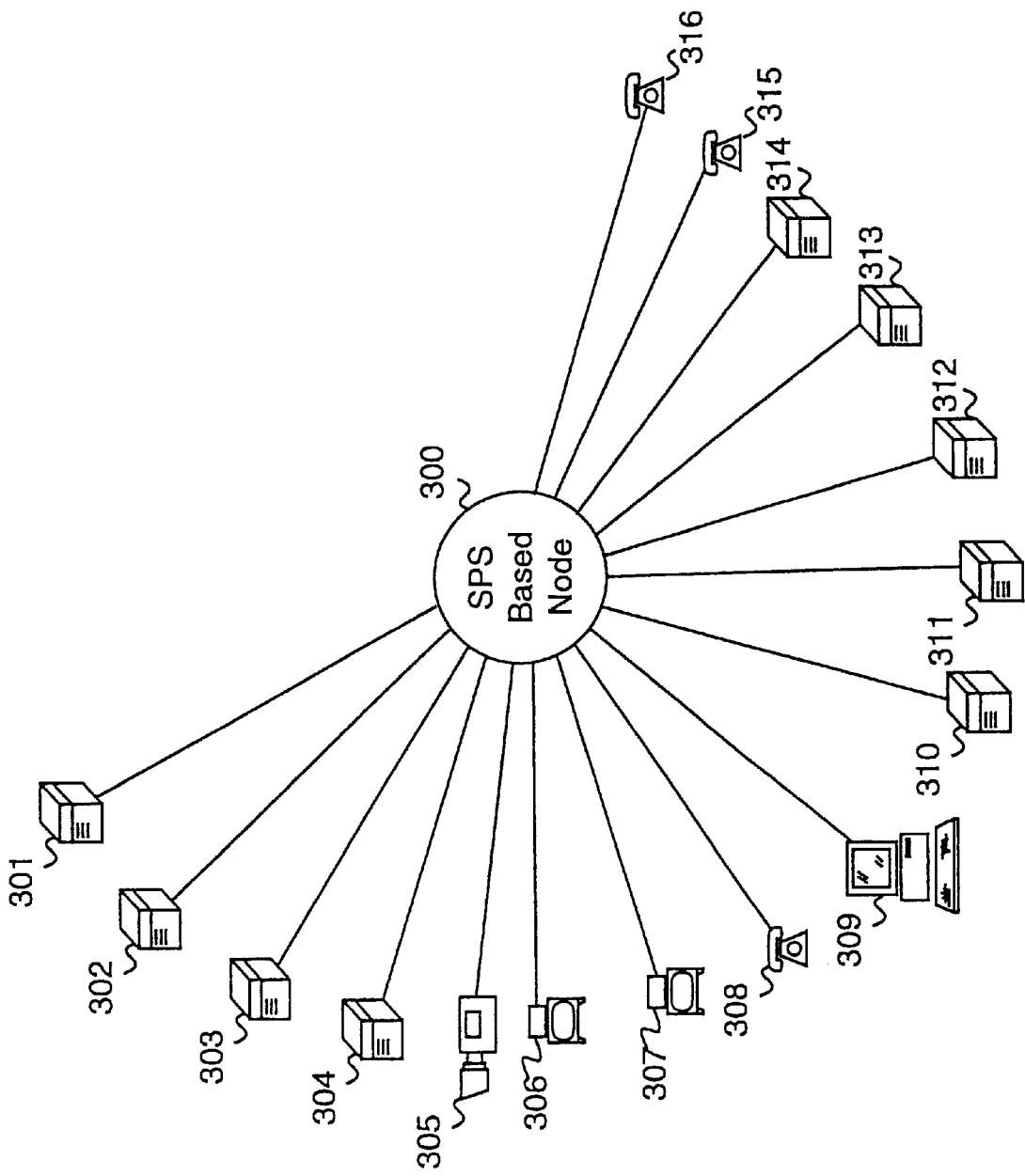
FIG. 3 is a block diagram depicting an SPS based node 300 coupled to a variety of communication devices in accordance with an embodiment of the present invention.

To further appreciate the versatility provided by SPS-based nodes, FIG. 3 is a block diagram depicting some of the communication devices that may be coupled to an SPS based node to facilitate communication via the integrated SPS medium. As shown in FIG. 3, an SPS based node 300 may be coupled to a variety of exemplary communication devices, including communication devices 301–304 such as PC's or servers associated with sub-networks, each of which may employ a different underlying link or physical layer protocol. By way of example, the illustrated communication devices may employ SONET, frame relay, asynchronous transfer mode (ATM), or any other type of physical or link layer protocol.

Communication devices 305–316 are other exemplary types of communication devices that may be coupled to an SPS node. By way of example, the illustrated communication devices are a video camera 305, set top box 306, tape/disc recorder 307, telephone 308, computer 309, server/network 310, private branch exchange 311, central office switch 312, router 313, local area network switch 314, facsimile machine 315, modem 316 or any other type of communication device. All communication devices utilizing the same network layer protocol may be connected directly or indirectly to the SPS based node.

Additionally, SPS based node 300 may be, but not limited to, any of the communication devices 301–316 illustrated. Accordingly, any communication device utilizing SPS communications may be considered an SPS based node. Any type of suitable communication device may be an SPS based node because SPS is in its most general sense is a communication methodology. SPS is a packet based form of communication employing synchronous packet switching. The types of packets used in SPS switching is dependent upon the network layer protocol being used. By way of example, if SPS medium 200 is an Internet Protocol (IP) network IP packets are used. IP packets are described in further detail in "Internetworking with TCP/IP, Principles, Protocols, and Architecture", by Douglas Comer, published by Prentice Hall, which is incorporated herein by reference in its entirety. Accordingly, other types of network layer protocols may be utilized.

Referring back to FIG. 2, communication in an SPS based communication network utilizes virtual networks, virtual paths and virtual circuit (VC) concepts. A virtual network (VN) is a set of communication devices that are grouped together. The grouping may be based upon the type of communication that the communication devices are capable of handling; the minimum bandwidth required by the communication devices; security clearances or any other suitable criteria. By way of example, telephones, video conferencing capable communication devices, communication devices requiring secure communications may be grouped within their respective VNs.

Communication devices are grouped according to their IP addresses, in one embodiment of the present invention. Ideally, only IP addresses within a particular VN may communicate with each other. Therefore, communication devices may possess more than one IP address in order to be placed within more than one VN. For example, a computer may be capable of telephonic communication or video conferencing. The computer is then assigned a unique IP address for each type of communication. Thus, it is possible to look at a destination and a source address of a particular communication and be able to determine exactly which VN to which the communication belongs.

In order to enable communications between the communication devices within a VN virtual paths must first be determined. Virtual paths are determined between the communication devices within the SPS communication network. Thus, each link between the communication devices of FIG. 2 would be a virtual path with its unique characteristics. A virtual network may also be a path through routing or switching communication devices rather than discrete links between two communicatively adjacent devices.

Considering SPS medium 200 of FIG. 2 as a single virtual path, by way of example, initially, SPS medium 200 is characterized as to its bandwidth capabilities. That is, SPS based nodes 210 and/or 220 may determine how much guaranteed traffic SPS medium 200 is capable of handling. SPS based nodes 210 and 220 may individually make this determination because they are in fact characterizing two different VPs. VPs are typically unidirectional so SPS based node 210 must characterize a VP for sending traffic to SPS based node 220, and SPS based node 220 must characterize a VP for sending traffic to SPS based node 210.

A virtual path may be specified by at least two attributes. The first attribute is a next node address, which specifies the Internet Protocol (IP) address of the next adjacent node in the virtual path. The second attribute is the bandwidth required to accommodate the communication to be carried out on the virtual path. Bandwidth requirements determine the switching of the communication over various transmission and transport technologies. Once the virtual path is determined, a virtual circuit is created along the virtual path to establish the communication.

A virtual network may be specified by at least four attributes. A source address scope specifies the scope of the source address. A destination address scope specifies the scope of the destination address. A time to live (TTL) value determines the length of time a virtual circuit within a virtual network may remain inactive before it is terminated. And, a service class, which classifies the requirements of the type of communication.

Service class is specified by at least two attributes. First, a committed information rate (CIR) may be specified. The CIR indicates the amount of guaranteed bandwidth required for the communications carried out within the virtual network. Second, traffic handling may be specified. Traffic handling informs the SPS network how to deal with communications within the virtual network that exceeds the CIR. There are at least three values for traffic handling. First, traffic handling may specify that the SPS network traffic shape the excess traffic. Second, the excess bandwidth may be designated for non-conformant traffic, i.e., traffic that does not meet the CIR of the virtual network. And third, traffic handling may inform the SPS network to discard the excess traffic.

To enable best effort traffic, a VN may require a CIR of zero. The traffic handling parameter may then indicate that all traffic in excess of the CIR, in this case all the traffic, be handled according to non-conformant traffic handling. That is, all the traffic is handled on a best effort basis.

A virtual network may be formed from two or more communication end points that fall within a particular communication category. Virtual paths link the particular communication devices that desire communication. Virtual circuits are formed through the virtual paths to couple the communication devices in a network. As in the described example, the present invention allows virtual circuits to be created between any type of communication devices connected to SPS based network 100. Typically, prior art data communication networks and telecommunication networks were disparate and incapable of cross-connection and/or integration.

Figure 4:
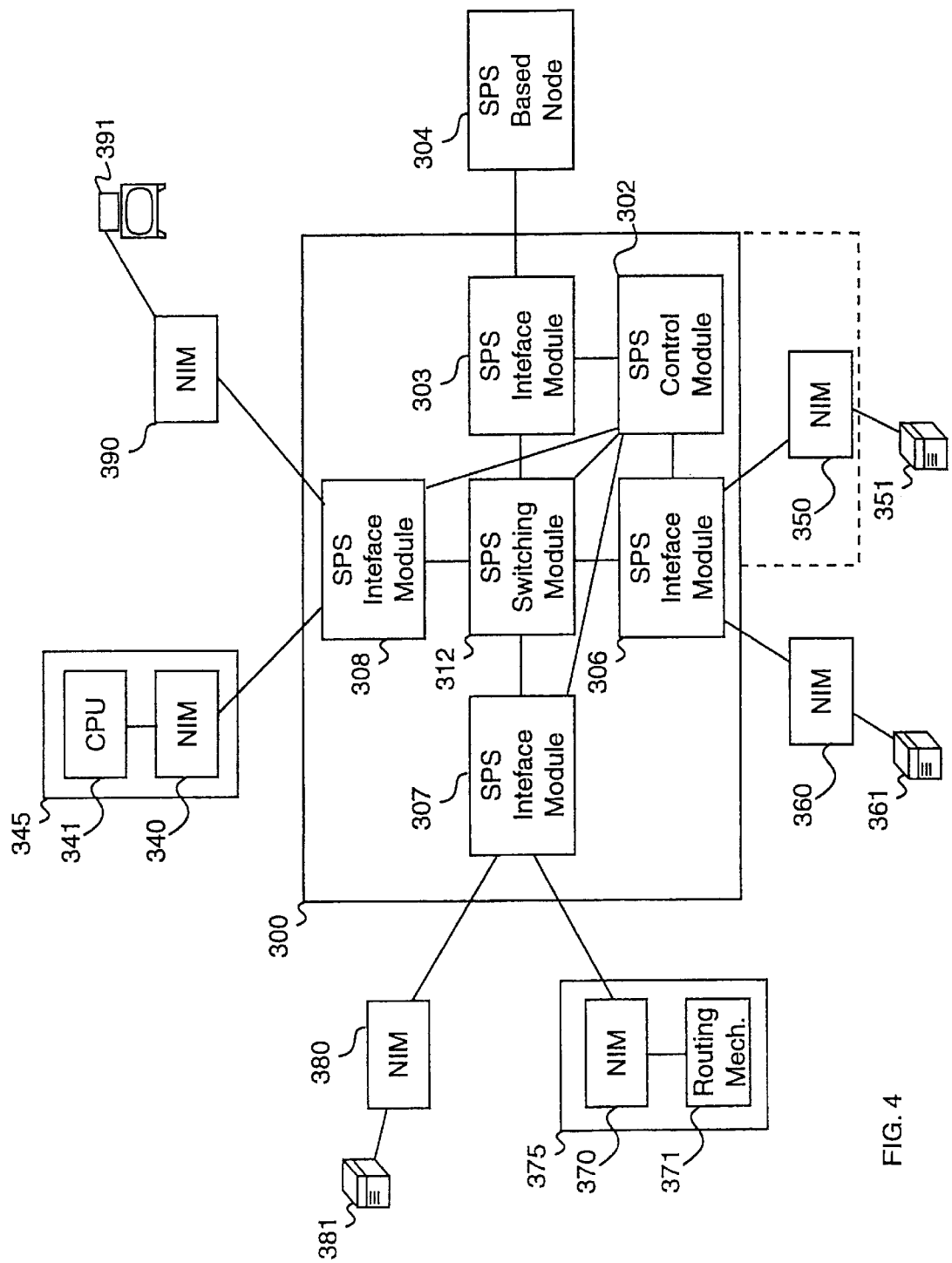
FIG. 4 is a block diagram of the interface between an SPS based node 300 and exemplary communication devices in accordance with an embodiment of the present invention.

The formation of a virtual circuit is described in further detail in reference to the following figures. FIG. 4 is a block diagram of the interface between an SPS based node 300 and exemplary communication devices in accordance with an embodiment of the present invention. SPS based node 300 includes a SPS control module 302, a SPS switching module 312 and a number of SPS interface modules 303 and 306–308.

Connected to the SPS interface modules 303 and 306–308 are SPS network interface modules 340, 350, 360, 370, 380 and 390 and another SPS based node 304. Each SPS network interface module (NIM) may be specifically designed to interconnect to the SPS based node different communication devices, which may be utilizing different communication protocols. Additionally, each NIM may be a peripheral device distinct from the corresponding communication device, incorporated in the communication device itself or incorporated into SPS based node 300. For example, NIM 340 is connected to a central processing unit (CPU) 341 within a computer 345. NIM 340 is integrated within computer 345 and connected to SPS interface module 308. NIM 340 could be a peripheral card or be hardwired into the computer. The NIM facilitates data transfer between the CPU and the SPS based node utilizing SPS switching.

NIM 350, on the other hand, may be part of SPS based node 300. NIM 350 is connected to a PBX 351 and translates incoming voice communications from the PBX into SPS based data packets and vice versa. At the same time, NIM 350 may also include circuitry to compress the voice information such that real time voice communications may be carried out through packetized transmissions.

NIM 360 is externally coupled to SPS based node 300 to SPS interface module 306. NIM 360 connects ATM switch 361 to the SPS based node. NIM 360 facilitates transfer of the data, which is encapsulated in ATM cells, through the SPS medium using SPS based communication.

NIM 370 is part of an Ethernet router 375 and connected to SPS interface module 307. The NIM is connected to the actual router mechanism 371 within the router 375. NIM 370 facilitates transfer of the data, which is encapsulated in Ethernet frames, through the SPS medium using SPS based communication.

In an analogous manner, NIM 380 connects a SONET node 381 to SPS interface module 307. And, NIM 390 couples a set top box 391 to SPS interface module 308. Additionally, SPS based node 300 may be coupled to another SPS based node through any of the SPS interface modules, such as SPS interface module 303 connected to SPS based node 304.

The various NIMs support various types of physical and link layer protocols (e.g., ATM, SONET, frame relay, etc.) that forwards information to the SPS interface modules. The SPS interface modules operate at the common network layer protocol, such as IP, as discussed. Thus, the overall SPS network may support a number of different types of link layer protocols so long as a common network layer protocol is chosen. For purposes of brevity, the detailed description of the present invention will focus primarily upon an IP based SPS network.

Initially, an NIM converts the information received from a corresponding communication device into the communication format appropriate for transmission through the SPS network. In the exemplary embodiment, ATM switch 361 may be transmitting video data to set top box 391 through SPS node 300. The video output of ATM switch 361 may have been received from a video server somewhere in the ATM network attached to the ATM switch. NIM 360 converts the video data into, in the exemplary embodiment, IP based packets for transmission through the SPS-based network implementing the IP protocol.

The IP packets are passed along to SPS interface module 306. SPS interface module creates the virtual circuit needed to pass along the video information to set top box 391. In one embodiment, SPS interface module 306 performs two functions. SPS interface module 306 performs admission control and polices existing virtual paths. These functions are discussed in further detail in reference to FIGS. 5a–5c, 6, 7a–7b.

After the SPS interface module has established the appropriate virtual path, the IP packets are passed along to SPS switching module 312. SPS switching module 312 routes the IP packets that contain the video data to the appropriate destination SPS interface module. In multicast situations where more than one destination is desired, SPS switching module 312 may transmit the IP packets to more than one SPS interface module. In larger networks, such as the one illustrated in FIG. 2, the SPS switching module 312 routes to an SPS interface module (e.g., SPS interface module 303) that is coupled to another SPS based node, such as SPS based node 304. However, the routing of the information is similar in both cases. SPS control module 302 initializes the SPS interface and switching modules, and preferably coordinates their interaction.

The SPS interface modules together with the SPS control module perform the dynamic allocation of the virtual circuits. Dynamic allocation allows for the accommodation of real time and best effort communication. Real time virtual circuits require that the SPS network provide guaranteed bandwidth. Best effort communications only require the SPS interface module to use its best efforts to establish communications based upon the available resources of the network rather than a virtual circuit with guaranteed parameters.

There are two methods of allocating resources to establish a desired virtual circuit: implicitly and explicitly. Implicit allocation, in one embodiment, derives the necessary information for resource allocation when the first packet of information is received. The SPS interface module implicitly obtains the communication parameters by determining the virtual network to which the first packet belongs and determines if the desired virtual circuit can be established. In explicit allocation, the source communication device explicitly informs the SPS interface module about the requirements for the desired virtual circuit.

Initially, virtual networks are established, as discussed above, and placed in a table. The virtual network table may be established manually by a network administrator at the establishment of the physical network and sub-networks. As more communication devices are added to the networks, the virtual network table may be amended. The virtual network table contains all the IP addresses of all the communication devices and the virtual networks to which they belong. The SPS control module of each SPS based node in the physical network maintains a copy of the virtual network table.

Each SPS control module also maintains a virtual path table. The virtual path table contains information about each virtual path between that particular SPS based node and every neighboring SPS based node or communication device. The information includes the amount of bandwidth that each VP has guaranteed. The SPS control module allocates a percentage of that bandwidth to real time traffic and the rest is allocated as reserve bandwidth. The SPS interface module consults the virtual path table when establishing virtual circuits, as discussed herein. Only the allocated portion of bandwidth designated for real time traffic will be assigned to real time VCs by the SPS control module of an SPS based node.

Figure 5A:
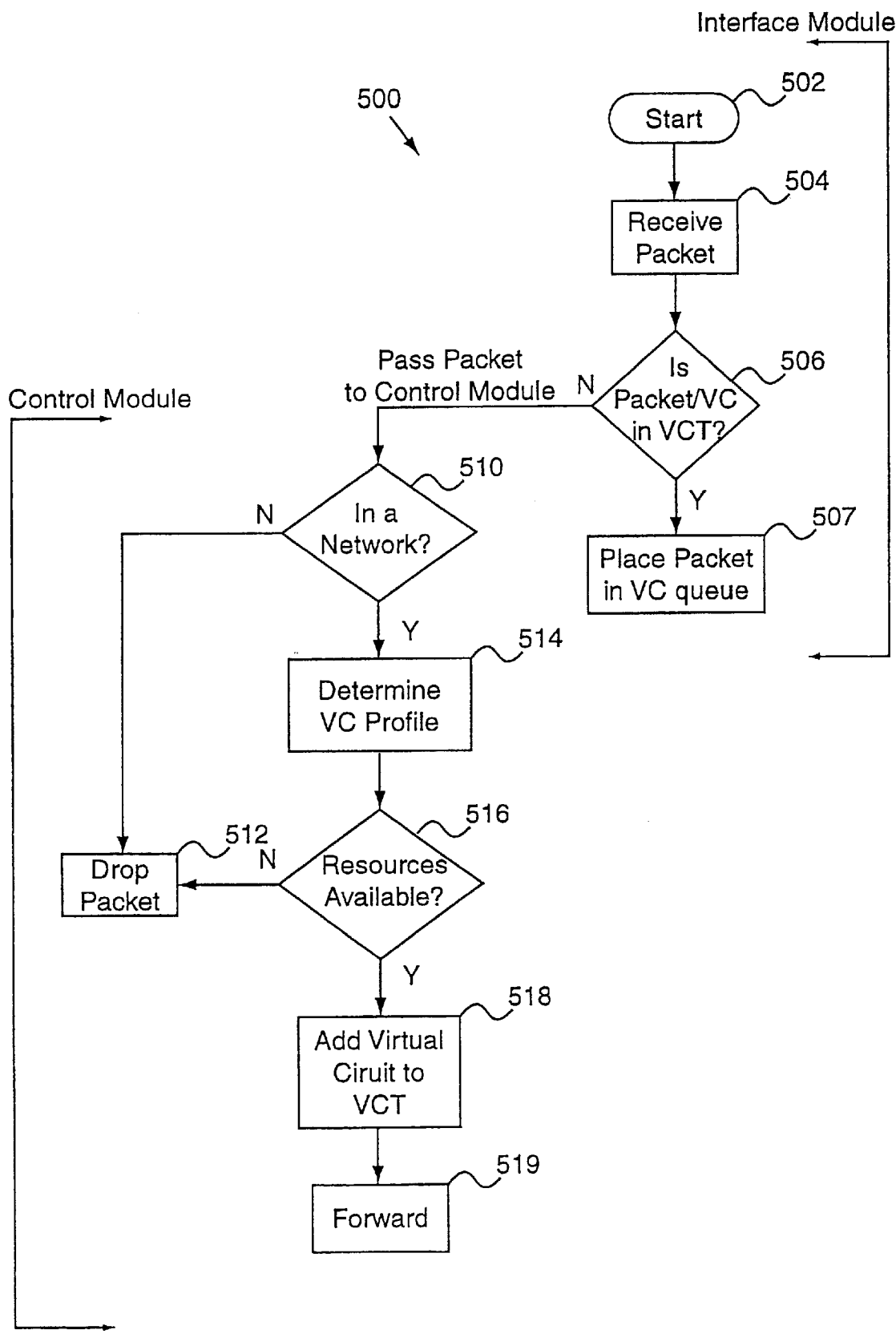
FIG. 5a is a flowchart 500 describing implicit allocation of a virtual circuit in accordance with an embodiment of the present invention.

FIG. 5a is a flowchart 500 describing implicit allocation of a virtual circuit in accordance with an embodiment of the present invention. Flowchart 500 begins in block 502. SPS interface module waits in block 504 until it receives a first packet of information from a communication device to which it may be directly or indirectly coupled. In the illustrated example of the present invention, the SPS node implements IP protocol and IP packets are received. IP packets typically contain the IP source address and destination address associated with the particular communication. The packet implicitly contains information about the CIR and traffic handling requirements for the packet through its subscription to a particular virtual network. A virtual circuit may be created to communicate a packet without having the packet actually carry the required information. Thus, implicit allocation is possible regardless of the underlying physical, link or network protocols being utilized.

A virtual circuit table (VCT) may be stored in SPS control module 302 and the SPS interface modules of the SPS based node which contains, among others, the destination and source addresses and the required bandwidth of established virtual circuits.

In block 506, if a received packet is not part of an established virtual circuit the packet belongs to a new virtual circuit. If the packet is part of an established virtual circuit the packet is placed in the appropriate queue associated with the virtual circuit in block 507, as discussed in further detail in reference to FIGS. 6a and 6b.

The operations of blocks 502 through 507 are performed by the SPS interface module that receives the packet. In block 506, if the packet does not belong to an established VC, the packet is passed to the SPS control module. The SPS control module determines in block 510 if the new virtual circuit belongs to a VN. The SPS control module consults the VN table and matches the source and destination addresses of the packet to the appropriate VN. A valid source and destination address pair should only belong to one unique VN.

In block 514 the SPS control module determines the bandwidth requirements for the new VC. Since each VN has a bandwidth parameter, the SPS control module need only determine which network to which the VC belongs. The VN also informs the SPS control module what the CIR and traffic handling parameters are for the new VC. The SPS control module also consults the VP table. The VP table contains information on all virtual paths that require the establishment of a new virtual circuit.

The SPS control module may then make a determination whether the new VC can be established in the next link in the VC in block 516. If the VP between the SPS based node and the next SPS based node in the virtual circuit has enough bandwidth to handle a new real time VC, if the VC is real time, operations flow to block 518. If the VC is a best effort VC the SPS control module determines if enough reserved bandwidth is available to handle a new best effort VC. If so, operations flow to block 518.

If there are not enough resources to establish a new VC the SPS control module drops the packet in block 512. Similarly, if back in block 510 the SPS control module determines that the source/destination address pair belonged to different VNs the packet is dropped. By dropping the first packet the VC requested by the source communication device is denied. The source communication device may persist in sending further packets, which will be denied, until the source communication device determines that the requested communication is not possible.

In another embodiment, if there are not enough resources to establish the new VC the SPS control module may still insert a new VC in the VCT. However, the VC assigned to the packet will have a CIR set to zero and traffic handling set to drop packets. Thus, all packets of the VC are dropped. When the source communication device does not receive a response from the destination, the source communication device will end the communications.

The creation of the virtual circuit, therefore, is dynamically performed according to the resources available from node to node. The SPS interface node allocates the necessary resources, or bandwidth, in block 518 if they are available. Allocation of the resources results in the establishment of the that link in the virtual circuit and an entry is made in the VCT. After the virtual circuit link has been established the packet is forwarded to the next node in block 519 directly by the SPS control module. This forwarding step bypasses the scheduling (of block 507) operations of the SPS interface modules that the subsequent packets will be subject to because it is the first packet. The SPS control module also allocates a small percentage of a VP's bandwidth to accommodate the forwarding of initial packets. Therefore, while the VC has been allocated along the VP, the bandwidth is not actually used until the next packet is received.

Figure 5B:
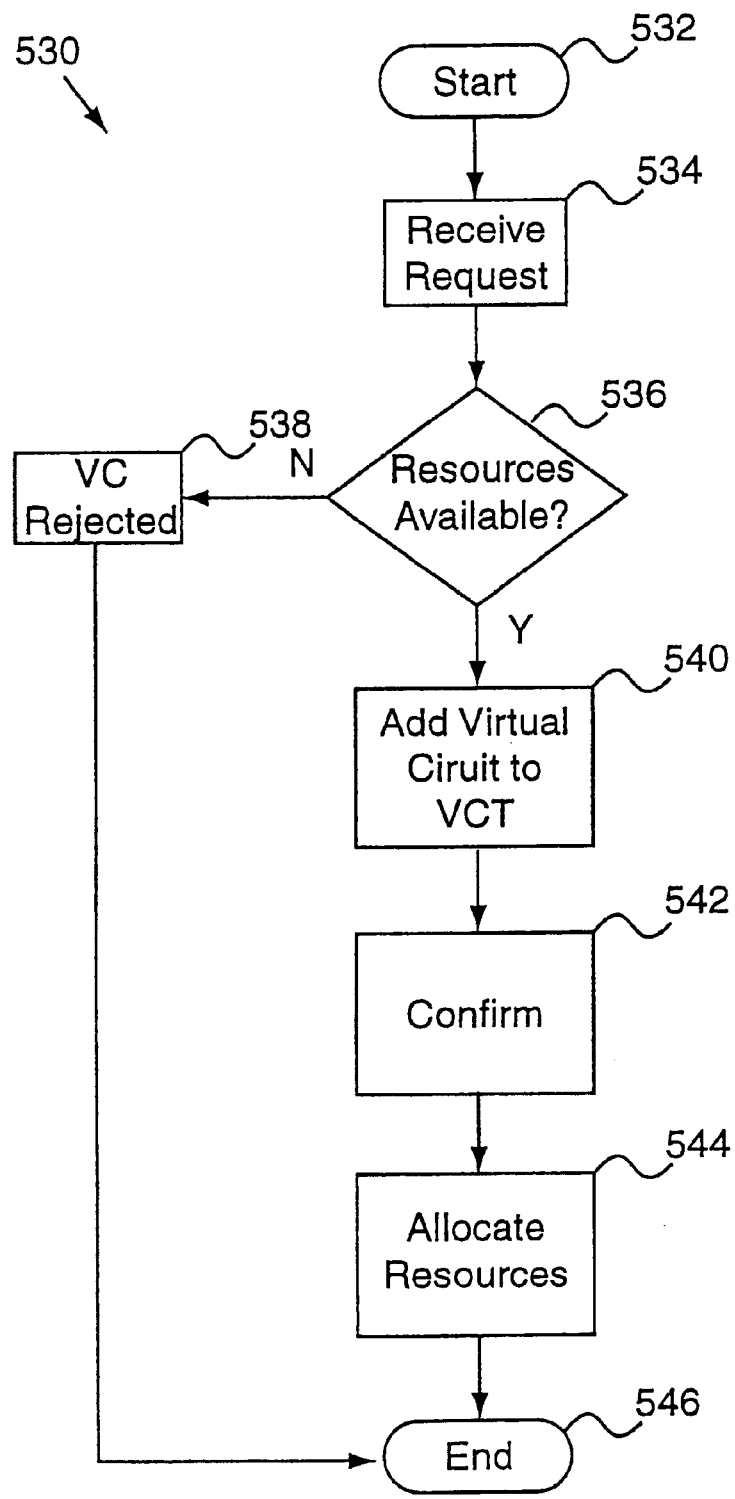
FIG. 5b is a flowchart 530 describing the process of explicit allocation of a virtual circuit in accordance with an embodiment of the present invention.

FIG. 5b is a flowchart 530 describing the process of explicit allocation of a virtual circuit in accordance with an embodiment of the present invention. Explicit allocation is performed when the communication device actively interacts with the SPS control module to create the desired virtual circuit. The signaling between the communication device and the SPS control module, by way of example, may be PSTN signaling, integrated services digital network (ISDN) signaling, ATM signaling or any other type of suitable communications signaling.

Flowchart 530 begins in block 532 and proceeds to block 534. The SPS control module waits in block 534 until it receives a request to establish a virtual circuit from the communication device or another SPS based node. Once the SPS control module receives the request, it determines if there are enough resources between it and the next node (or destination device) to establish the next link in the new virtual circuit in block 536. Again, the SPS control modules looks at the VN table and VP table to determine if the communication is valid and enough resources are available. If the communication is not valid or resources are not available the request is rejected in block 538 and operations end in block 546.

If the resources are available, the SPS control module enters the source address and the bandwidth requirements to the VCT in block 540. The establishment of the virtual circuit, with its particular requirements, are confirmed by the SPS control module associated with the next node to ensure the availability of resources at the next node. The process is repeated until the destination of the new VC is reached to ensure the availability of resources along the entire VC.

Proceeding to block 544 the SPS interface module allocates the resources between it and the next node. For a real time virtual circuit the required bandwidth is allocated. The SPS interface module will allocate the desired amount of bandwidth unless it exceeds the amount of bandwidth that is already allocated to real time virtual circuits. In another embodiment, the SPS interface module may be designed to always set aside a portion of all bandwidth for best effort virtual circuits. In such a manner, a number of real time virtual circuits may be accommodated with best effort virtual circuits. Therefore, the SPS interface module may allow real time and best effort communications to proceed at the same time. The bandwidth is dynamically allocated to both types of communications and only permits the number of virtual circuits that can be handled by the available resources without interruption. Once the resources for the virtual circuits have been allocated the process then ends in block 546.

The ability to dynamically allocate real time and best effort virtual circuits permits the integration of real time and best effort communications across a single medium. The number of virtual circuits formed at any one time is limited such that bandwidth requirements are fulfilled for each existing virtual circuit. Thus, real time communications are kept reliable, while at the same time existing best effort communications are not dropped.

There are times where it is desired to increase the bandwidth of an existing virtual circuit. The virtual circuit is usually a CIR virtual circuit since traffic handling virtual circuits proceed on a best effort basis. Similar to flowchart 530 of FIG. 5b, the communication device actively signals for increased bandwidth with the SPS interface module. The SPS control module waits until it receives a request for increased bandwidth of an existing CIR virtual circuit from a communication device. Once a request is made by the signaling communication device the SPS interface module increases the bandwidth of the VC depending upon the available resources.

Through the process of explicit and implicit allocation, resources are dynamically allocated to new and existing virtual circuits. Referring back to FIG. 5a, packets are placed in VC queues to be scheduled for forwarding to the next nodes after the virtual circuits have been configured.

Figure 6A:
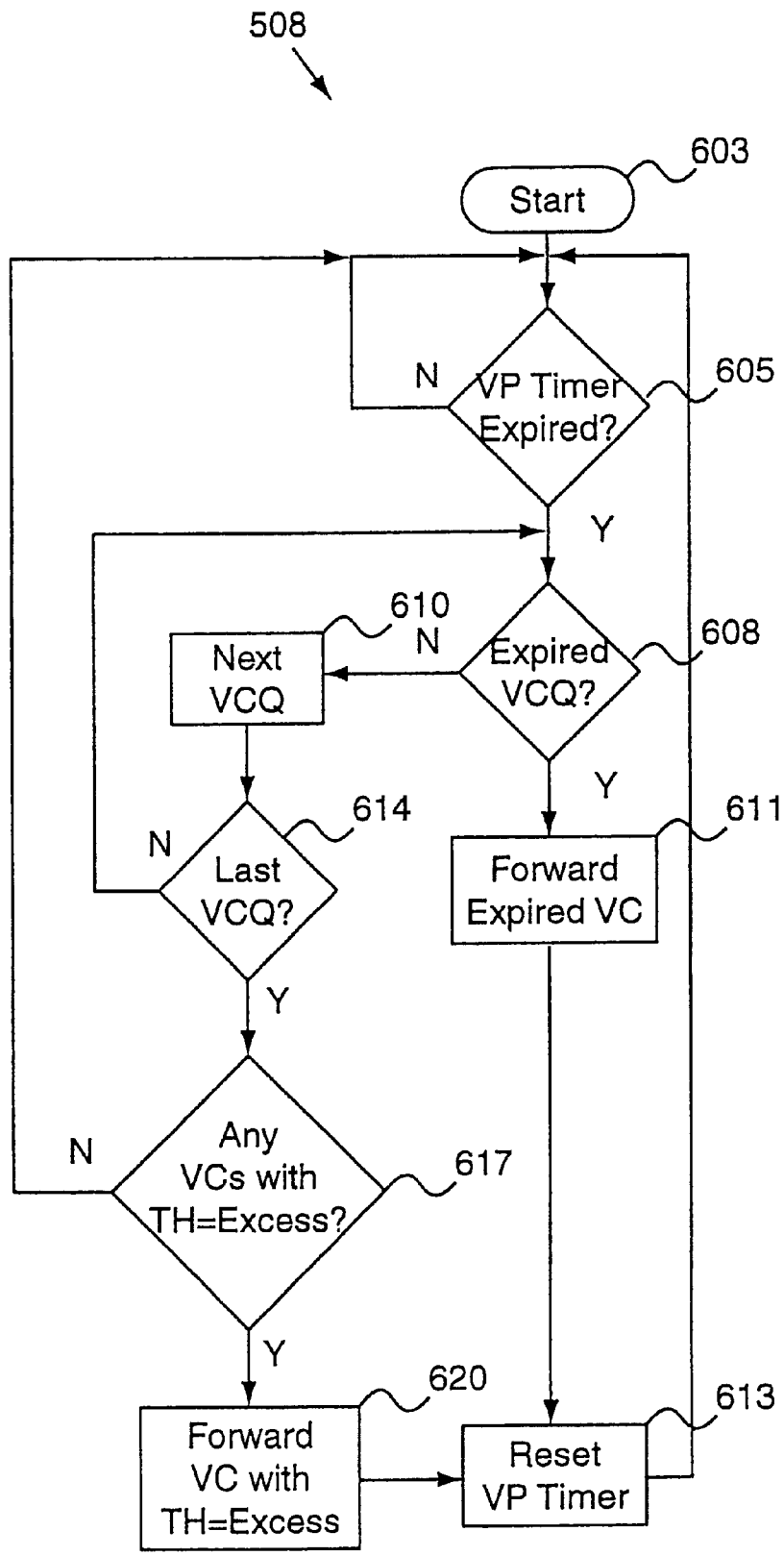
FIG. 6a illustrates a flowchart 508 describing the process of virtual path queueing in accordance with an embodiment of the present invention.
Figure 6B:
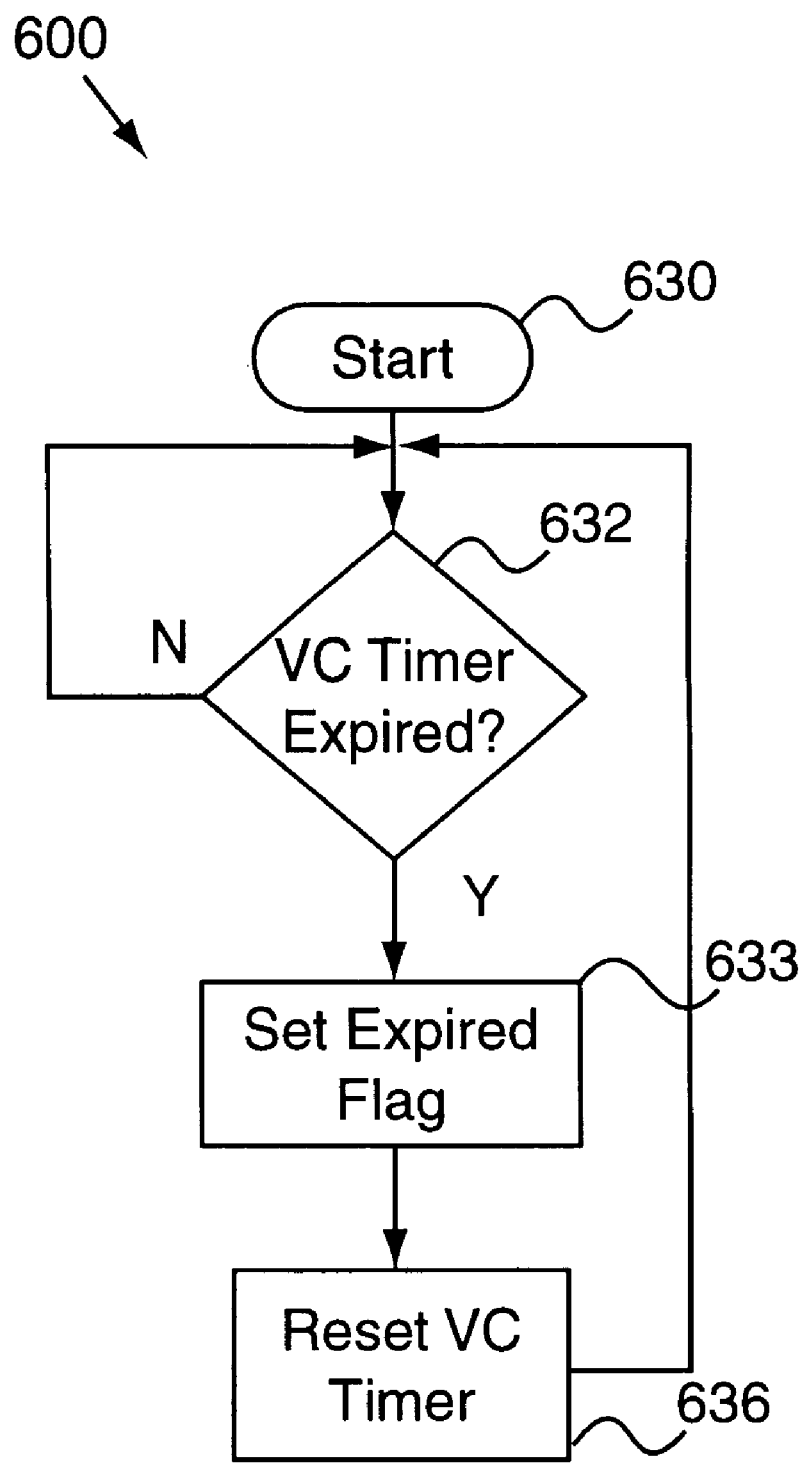
FIG. 6b illustrates a flowchart 508 describing the process of virtual circuit queueing in accordance with an embodiment of the present invention.

FIGS. 6a and 6b illustrate a scheduling process in accordance with an embodiment of the present invention.

FIG. 6a illustrates a flowchart 508 describing the process of scheduling a virtual path by an SPS interface module in accordance with an embodiment of the present invention. Flowchart 508 begins in block 603 and proceeds to block 605 to determine if the virtual path is ready to receive a new packet. The flowchart is exemplary of all the virtual paths utilized by the SPS interface module. Each virtual path has a timer which expires when it is ready to receive a new packet of data. The timer is set each time a packet is received according to the length of the packet and the guaranteed bandwidth of the VP. For example, the longer the packet the longer the time interval before the timer expires. When the timer expires a VP timer flag is set by the SPS interface module. The SPS interface module keeps checking in block 605 as to whether the VP timer flag has been set.

If the VP timer flag is set, the SPS interface module proceeds to block 608 to determine if any of the VC queues are ready to send a packet, which is discussed in further detail in reference to FIG. 6b. If a VC queue is ready to send a packet the SPS interface module schedules the packet for forwarding in block 611. Once the packet is forwarded the VP timer flag is reset, and the VP timer is reset according to the length of the forwarded packet and the bandwidth of the VP.

If the first VC queue has not expired, operations proceed to block 610 and 614 until all the VC queues have been checked. Once the last VC queue has been checked in block 614 and all of the VC queues have not expired, the SPS interface module proceeds to block 617. In block 617 the SPS interface module checks the traffic handling parameters of the VC queues. If any of the VCs of the VC queues have indicated that any excess bandwidth should be forwarded on best effort basis that VC queue is scheduled for forwarding in block 620. The SPS interface module keeps track of the order of the best effort VC queues in order to ensure that all VC queues receives its turn to send a packet when excess bandwidth is available. After forwarding the VP timer and VC timer flags are reset in block 613.

As explained earlier, best effort VCs are basically VCs with CIR set to zero and traffic handling set to best effort. In effect best effort VCs never expire, but instead wait for the times when the real time VCs do not need to immediately send data. At the same time, real time VCs with traffic handling set to best effort may also send data, if next in order of the best effort VCs, when the real time VCs do not need to immediately send data.

In a separate process, if the traffic of a real time VC exceeds its requested bandwidth and its traffic handling is set to traffic shaping, the VC queue simply waits for its next time to send data. If the traffic handling is set to best effort the excess traffic is sent when no other real time VCs are ready to send. Finally, if traffic handling is set to drop packet then the excess traffic is simply dropped.

The timing of a VC queue for forwarding is now discussed in references to FIG. 6b. FIG. 6b illustrates a flowchart 600 describing the timing of a virtual circuit queue for forwarding in accordance with an embodiment of the present invention. Flowchart 600 begins in block 630 and proceeds to block 632. Each virtual circuit has a timer indicating when it is ready to send data. The VC timer is set according to the bandwidth required by the VC, the length of the packet to be sent next. For example, if a VC queue is ready to send a short packet its timer will be a correspondingly small value. If the VC queue is ready to send a packet containing more information its timer will be a greater value. Therefore, a VC queue may wait longer to send larger packets and still satisfy its bandwidth requirements.

The SPS interface module sets a expired flag for the VC in block 633 when the VC timer has expired. In block 636 the VC timer is then reset once the packet is actually forwarded (in block 508 of FIG. 5b). Again, the VC timer is reset according to the length of the packet to be sent.

Accordingly, the illustrated embodiment of the present invention is capable of dynamically establishing virtual circuits and forwarding SPS packets to permit integrated communications irrespective of the formats and types of communications implemented by the origination or destination end devices or sub-networks. Also, existing virtual circuits may be dynamically allocated more resources dependent upon availability. As will be discussed, policing and termination of virtual circuits is also performed, in one embodiment of the present invention.

Figure 7A:
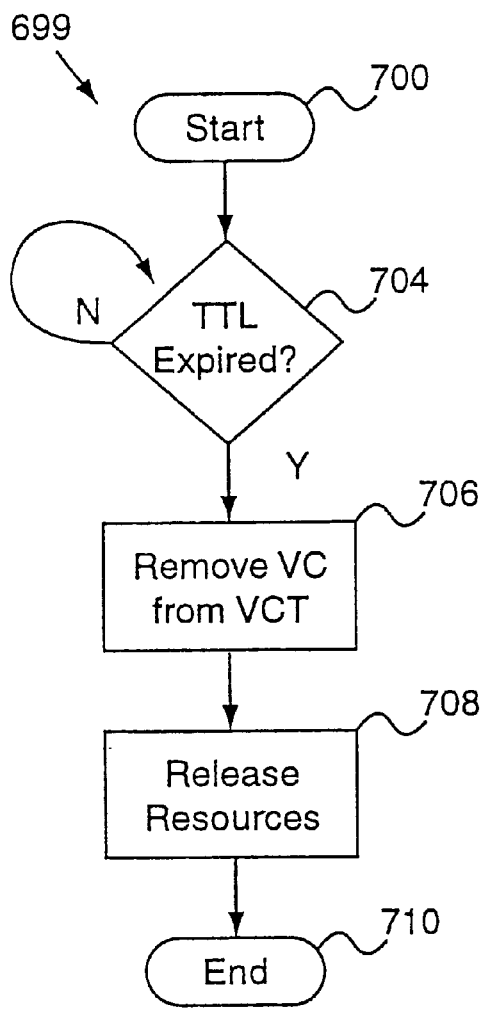
FIG. 7a illustrates a flowchart 558 describing the process of implicitly terminating a virtual circuit in accordance with an embodiment of the present invention.

The process of establishing and maintaining virtual circuits in accordance with the present invention having been discussed, the process of termination of the virtual circuits in accordance with one embodiment of the present invention is now described. FIG. 7a illustrates a flowchart 558 describing the process of implicitly or explicitly terminating a virtual circuit in accordance with an embodiment of the present invention. Flowchart 669 begins at block 700 either implicitly or explicitly. The process is started implicitly when resources are checked by the SPS interface module in order to clear resources, as in FIG. 5c. The process is started explicitly when a communication device signals the SPS interface module to terminate virtual circuits that are inactive.

The SPS interface module proceeds from block 700 to block 704 where it monitors the flow of packets in the virtual circuit of interest. The time to live parameter of the virtual network that is inherited by the virtual circuit determines the measure of inactivity required to terminate the virtual circuit. The time to live value for each virtual circuit is decremented every period when the virtual circuit is inactive. The SPS interface module checks the decremented value of the virtual circuit of interest to determine if the time to live value has been exceed in block 704. If the decremented time to live value is still valid the process returns to block 704. If the decremented time to live value is invalid the SPS interface module proceeds to block 706 and removes the virtual circuit from the VCT. Proceeding to block 708 the SPS interface module releases the resources allocated to the virtual circuit and the process ends in block 710.

Figure 7B:
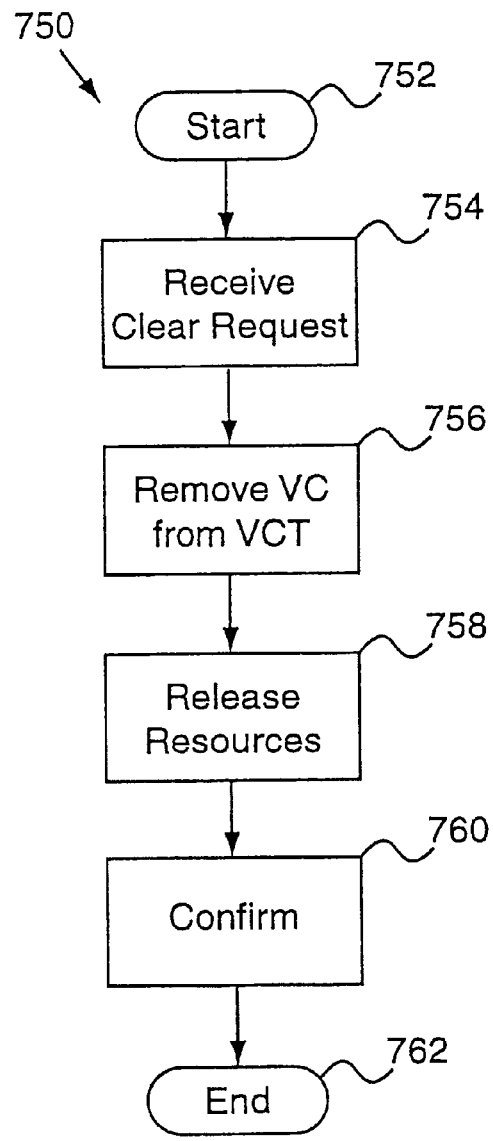
FIG. 7b illustrates a flowchart 750 describing the explicit termination of a virtual circuit in accordance with an embodiment of the present invention.

A communication device may also signal the SPS interface module to immediately terminate the virtual circuit because communications have been completed. FIG. 7b illustrates a flowchart 750 describing the explicit termination of a virtual circuit in accordance with an embodiment of the present invention. Flowchart 750 begins at block 752 by receiving a signal from a communication device or a previous node. In block 754 the SPS interface module receives a clear request from the communication device or a previous node. After the request is received the SPS interface module removes the virtual circuit from the VCT in block 756. Proceeding to block 758 the SPS interface module releases the resources allocated to the virtual circuit. Next in block 760 the SPS interface module confirms the release of the resources with the next node. Once the release of resources have been confirmed the process ends in block 762.

The ability to dynamically drop inactive virtual circuits maximizes the availability of resources for new data flows (irrespective of the traffic class) and for existing data flows to acquire additional resources to optimize communication. In one embodiment, the SPS based network actively polices inactive virtual circuits in order to reallocate the resources. Also, virtual circuits may be terminated by the source of the virtual circuit once communications have ceased.

As can be appreciated from the foregoing, forming, maintaining and terminating virtual circuits may be performed regardless of the type of protocol being used to initially generate the communication. While the illustrated embodiment has focused on IP packets as the form of the communication, any suitable type of communication protocol may be utilized. SPS based communications provides the mechanism for establishing the communications and the ability to integrate disparate types of communications over a single SPS based medium.

Figure 8A:
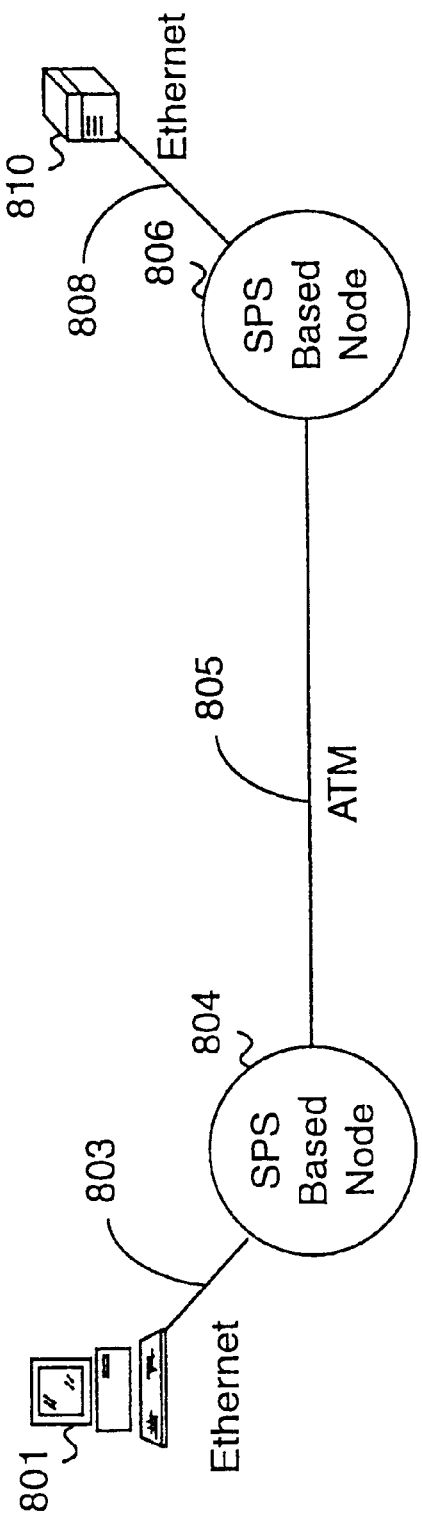
FIG. 8a is a block diagram of an SPS based network providing ATM functionality in accordance with an embodiment of the present invention.

FIG. 8a is a block diagram of an SPS based network providing ATM functionality in accordance with an embodiment of the present invention. The SPS based network includes SPS based nodes 804 and 806 coupled together over a medium 805. Communication device 801 is coupled to SPS based node 804 by an Ethernet (layer 2) connection 803. Server 810 is coupled to SPS based node 806 by another Ethernet connection 808. Ethernet is a connectionless oriented link layer protocol, while ATM is a connection oriented protocol.

While communication device 801 and server 810 may utilize, and be part of an Ethernet network, they can obtain the advantages of an ATM network through the SPS based nodes because the switching capabilities of the SPS based nodes provide connection oriented connectivity without having to convert to an ATM link layer. Thus, the SPS based nodes allows the different formats to be utilized in an integrated manner. Similar to the discussion above, the SPS based nodes create ATM-like communications over the medium incorporating the data passed from communication device 801 and server 810. The Ethernet based data is carried over connection oriented packets through medium 805.

In this manner, SPS based networks provides ATM functionality without the expense of switching an entire network to ATM equipment. Existing equipment may be utilized and integrated with SPS based nodes.

Figure 8B:
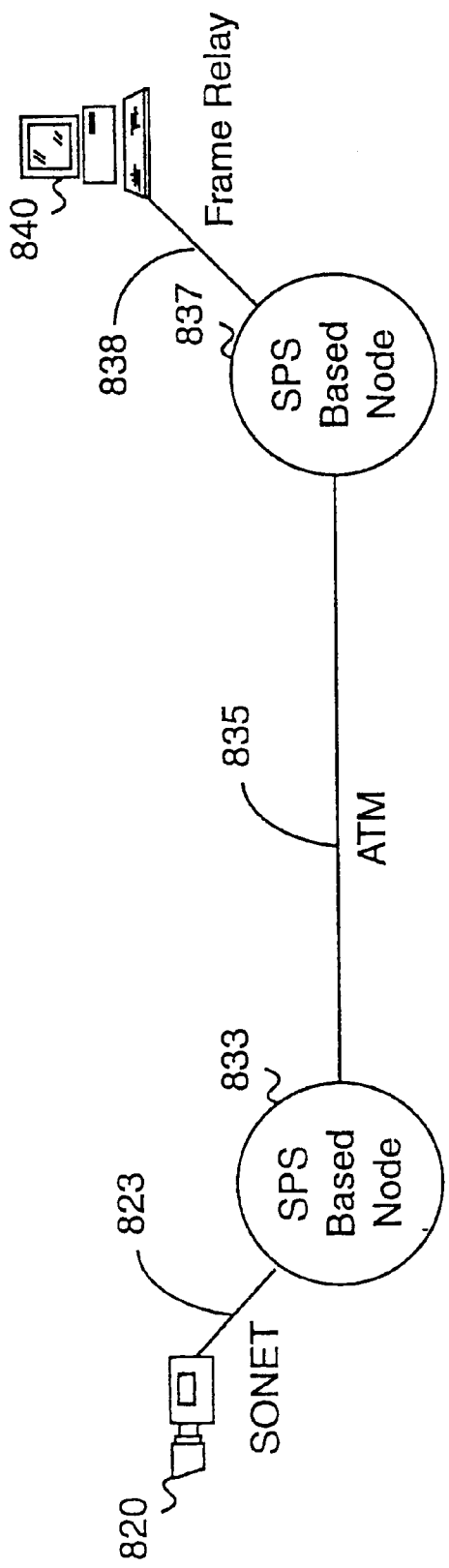
FIG. 8b is a block diagram of an integrated SPS based network in accordance with another embodiment of the present invention.

FIG. 8b is a block diagram of an integrated SPS based network in accordance with another embodiment of the present invention. The SPS based network includes two SPS based nodes 833 and 837 communicating over a medium 835. A video camera 820 coupled to a SONET (layer 1) network 823 is connected to SPS based node 833 through the SONET network. Computer 840 is connected to a frame relay network (layer 2) and communicates with SPS based node 837 through that network. The SPS based nodes allow real time images captured by camera 820 to be received by computer 840, even though they are using different types of protocols. Any of the different types of communications and protocols discussed, as well as those not discussed and known in the art, may be similarly integrated in accordance with the present invention, so long as a common network layer protocol is utilized.

Thus the ability to integrate disparate communication protocols, such as a private real time communication network and a private data network, allows the user to effectively halve the cost of providing full communications between two individuals in a given network. Further, existing hardware need not be abandoned and completely replaced. Instead, in accordance with an embodiment of the present invention, the different communication networks may be integrated over a single SPS based medium.

Telecommunication providers also benefit by being relieved of the responsibility of providing two types of mediums to its customers. A single SPS based medium may serve to provide voice, data, real time, best effort and any other suitable type of communication over a single medium. Therefore, the time and money required to establish and maintain different types of networks and medium is dramatically decreased.

These and other advantages of the present invention, as well as the myriad number of variations of the embodiments disclosed, are novel contributions to the field of data communications. While this invention has been described in terms of several preferred embodiments, there are alterations, permutations, and equivalents which fall within the scope of this invention.

It should also be noted that there are many other alternative ways of implementing the methods and apparatuses of the present invention. It is therefore intended that the specification herein be interpreted as including all such alterations, permutations, and equivalents as fall within the true spirit and scope of the present invention.

What is claimed is:

1. A synchronous packet switching (SPS) communication network having at least one communication device for forwarding a plurality of information packets, each information packet having a destination address and a source address in the communication network, the communication network including, a plurality of SPS communication devices, each SPS communication device having an at least one communication address, wherein the at least one communication address corresponds to one of the destination or source addresses of the plurality of information packets, and a plurality of virtual networks, wherein each communication address belongs to only one of the plurality of virtual networks, such that a first communication device can only communicate with a second communication device if each of the first and second communication devices both have their at least one communication address belonging to a common virtual network, each virtual network having a required bandwidth, wherein at least one SPS communication device from the plurality of SPS communication devices is communicatively coupled to at least one other SPS communication device from the plurality of SPS communication devices by a virtual path, the virtual path having an available bandwidth for conducting communications between the SPS communication device and the other SPS communication device, the SPS communication device receiving a first information packet from a source communication device, the destination address of the first information packet requiring that the first information packet be forwarded to the other SPS communication device, and wherein the SPS communication device determines whether the destination source addresses of the first information packet belongs to a unique virtual network, and if the destination and source addresses of the first information packet belongs to the unique virtual network, the SPS communication device compares the required bandwidth of the unique virtual network to the available bandwidth of the virtual path, and if the available bandwidth of the virtual path is equal or greater than the required bandwidth, the SPS communication device forwards the first information packet to the other SPS communication device, the SPS communication device establishing a selected virtual circuit of a plurality of virtual circuits, the selected virtual circuit indicative of a route and a required bandwidth associated with the forwarding of the first information packet.

2. The SPS communication network of claim 1, wherein when the SPS communication device receives a second information packet, having source and destination addresses that are the same as the source and destination addresses of the first information packet, the SPS communication device compares the source and destination addresses of the second information packet with the plurality of virtual circuits and forwarding the second information packet along the selected virtual circuit over the virtual path because the destination and source addresses of the second information packet corresponds to the route and required bandwidth associated with the first information packet of which the selected virtual circuit is indicative.

3. The SPS communication network of claim 2, wherein the selected virtual circuit is a real time virtual circuit, such that the required bandwidth associated with the first information packet is a positive value.

4. The SPS communication network of claim 3, wherein the selected virtual circuit includes a handling instruction, the handling instruction informing the SPS communication device concerning the handling of subsequent information packets exceeding the required bandwidth associated with the first information packet.

5. The SPS communication network of claim 4, wherein the handling instruction is traffic shaping, such that the SPS communication device is informed to forward subsequent information packets exceeding the required bandwidth associated with the first information packet according to the required bandwidth associated with the first information packet.

6. The SPS communication network of claim 4, wherein the handling instruction is best effort, such that the SPS communication device is informed to forward subsequent information packets exceeding the required bandwidth associated with the first information packet over a bandwidth that is a difference between the available bandwidth of the virtual path and the required bandwidth if the difference is a positive value.

7. The SPS communication network of claim 4, wherein the handling instruction is drop excess, such that the SPS communication device is informed to drop subsequent information packets exceeding the required bandwidth associated with the first information packet.

8. The SPS communication network of claim 2, wherein the selected virtual circuit is a best effort virtual circuit, such that the required bandwidth associated with the first information packet is zero, and the selected virtual circuit includes a handling instruction, the handling instruction informing the SPS communication device concerning the handling of subsequent information packets exceeding the required bandwidth associated with the first information packet.

9. The SPS communication network of claim 8, wherein the handling instruction is best effort, such that the SPS communication device is informed to forward subsequent information packets exceeding the required bandwidth associated with the first information packet over a bandwidth that is the available bandwidth of the virtual path.

10. A communication network having at least one communication device for forwarding a plurality of information packets, each information packet having a destination address and a source address in the communication network, the communication network including, a plurality of communication devices, each communication device having an at least one communication address, wherein the at least one communication address corresponds to one of the destination or source addresses of the plurality of information packets, and a plurality of virtual networks, wherein each communication address belongs to only one of the plurality of virtual networks, such that a first communication device can only communicate with a second communication device if each of the first and second communication devices both have their at least one communication address belonging to a common virtual network, each virtual network having a required bandwidth, at least one communication device from the plurality of communication devices communicatively coupled to at least one other communication device by a virtual path, the virtual path having an available bandwidth for conducting communications between the communication devices, the at least one communication device receiving a first information packet from a source communication device, the destination address of the first information packet requiring that the first information packet be forwarded to the at least one other communication device, wherein the at least one communication device determines whether the destination source addresses of the first information packet belong to a unique virtual network, and if the destination and source addresses of the first information packet belong to the unique virtual network the at least one communication device compares the required bandwidth of the unique virtual network to the available bandwidth of the virtual path, and if the available bandwidth of the virtual path is equal or greater than the required bandwidth, the at least one communication device forwards the first information packet to the at least one other communication device, the device establishing a selected virtual circuit of a plurality of virtual circuits, the selected virtual circuit indicative of a route and a required bandwidth associated with the forwarding of the first information packet.

11. The communication network having at least one communication device of claim 10, wherein when the at least one communication device receives a second information packet, having source and destination addresses that are the same as the source and destination addresses of the first information packet, the at least one communication device compares the source and destination addresses of the second information packet with the plurality of virtual circuits and forwarding the second information packet along the selected virtual circuit over the virtual path because the destination and source addresses of the second information packet corresponds to the route and required bandwidth associated with the first information packet of which the selected virtual circuit is indicative.

12. The communication network having at least one communication device of claim 11, wherein the selected virtual circuit is a real time virtual circuit, such that the required bandwidth associated with the first information packet is a positive value.

13. The communication network having at least one communication device of claim 12, wherein the selected virtual circuit includes a handling instruction, the handling instruction informing the at least one communication device concerning the handling of subsequent information packets exceeding the required bandwidth associated with the first information packet.

14. The communication network having at least one communication device of claim 13, wherein the handling instruction is traffic shaping, such that the at least one communication device is informed to forward subsequent information packets exceeding the required bandwidth associated with the first information packet according to the required bandwidth associated with the first information packet.

15. The communication network having at least one communication device of claim 13, wherein the handling instruction is best effort, such that the at least one communication device is informed to forward subsequent information packets exceeding the required bandwidth associated with the first information packet over a bandwidth that is a difference between the available bandwidth of the virtual path and the required bandwidth if the difference is a positive value.

16. The communication network having at least one communication device of claim 13, wherein the handling instruction is drop excess, such that the at least one communication device is informed to drop subsequent information packets exceeding the required bandwidth associated with the first information packet.

17. The communication network having at least one communication device of claim 11, wherein the selected virtual circuit is a best effort virtual circuit, such that the required bandwidth associated with the first information packet is zero, and the selected virtual circuit includes a handling instruction, the handling instruction informing the SPS communication device concerning the handling of subsequent information packets exceeding the required bandwidth associated with the first information packet.

18. The communication network having at least one communication device of claim 17, wherein the handling instruction is best effort, such that the at least one communication device is informed to forward subsequent information packets exceeding the required bandwidth associated with the first information packet over a bandwidth that is the available bandwidth of the virtual path.

\* \* \* \* \*